United States Patent
Minagawa et al.

(10) Patent No.: US 10,975,176 B2
(45) Date of Patent: Apr. 13, 2021

(54) HYDROPHILIC SUBSTRATE

(71) Applicant: SUMITOMO RUBBER INDUSTRIES, LTD., Kobe (JP)

(72) Inventors: Yasuhisa Minagawa, Kobe (JP); Mitsuko Takii, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 113 days.

(21) Appl. No.: 16/237,923

(22) Filed: Jan. 2, 2019

(65) Prior Publication Data

US 2019/0233555 A1 Aug. 1, 2019

(30) Foreign Application Priority Data

Jan. 31, 2018 (JP) .............. JP2018-015011

(51) Int. Cl.
*C08F 20/28* (2006.01)
*C09D 133/14* (2006.01)
*C08K 5/315* (2006.01)
*C08F 120/28* (2006.01)
*C08J 7/04* (2020.01)

(52) U.S. Cl.
CPC .......... *C08F 20/28* (2013.01); *C08F 120/28* (2013.01); *C08J 7/0423* (2020.01); *C08K 5/315* (2013.01); *C09D 133/14* (2013.01); *C08F 2500/01* (2013.01); *C08J 2333/14* (2013.01); *C08J 2333/16* (2013.01)

(58) Field of Classification Search
CPC ..................................... C09D 133/14
See application file for complete search history.

(56) References Cited

U.S. PATENT DOCUMENTS

2016/0074149 A1* 3/2016 Tanaka .............. A61F 2/07
 623/23.7
2018/0011406 A1* 1/2018 Hatakeyama ........ G03F 7/0045

FOREIGN PATENT DOCUMENTS

JP 2005-523981 A 8/2005
WO WO 03/093357 A1 11/2003

* cited by examiner

*Primary Examiner* — Ramsey Zacharia
(74) *Attorney, Agent, or Firm* — Birch, Stewart, Kolasch & Birch, LLP

(57) ABSTRACT

The present invention provides a hydrophilic substrate including a hydrophilic polymer layer having a smooth surface and formed of a special polymer (hydrophilic polymer). Included is a hydrophilic substrate including on its surface a hydrophilic polymer layer formed of a hydrophilic polymer having a number average molecular weight of 40,000 or more.

2 Claims, 1 Drawing Sheet

Example 2          Comparative Example 1
 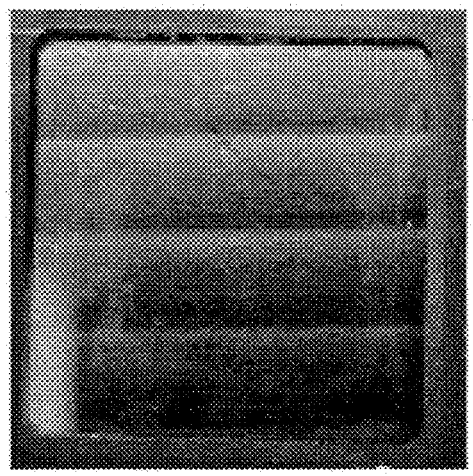

HYDROPHILIC SUBSTRATE

TECHNICAL FIELD

The present invention relates to a hydrophilic substrate including a layer formed of a hydrophilic polymer having a predetermined molecular weight.

BACKGROUND ART

It has been proposed to coat the surface of substrates with special polymers in order to prepare devices for capturing specific cells (e.g. blood cells, cancer cells present in blood or biological fluid) from blood or biological fluid.

However, it is difficult for some special polymers to form a smooth surface by coating. Since the surface smoothness of the substrates affects the ability to capture specific cells, there is a need for substrates having a smooth surface with excellent properties, e.g. in terms of ability to capture specific cells such as cancer cells.

CITATION LIST

Patent Literature

Patent Literature 1: JP 2005-523981 T

SUMMARY OF INVENTION

Technical Problem

The present invention aims to solve the problem and provide a hydrophilic substrate including a hydrophilic polymer layer having a smooth surface and formed of a special polymer (hydrophilic polymer).

Solution to Problem

The present invention relates to a hydrophilic substrate, including on its surface a hydrophilic polymer layer formed of a hydrophilic polymer having a number average molecular weight of 40,000 or more.

Preferably, the hydrophilic substrate is obtained by surface coating with a solution of the hydrophilic polymer.

Preferably, the hydrophilic polymer layer is formed of at least one hydrophilic polymer selected from the group consisting of polymers represented by the following formula (I):

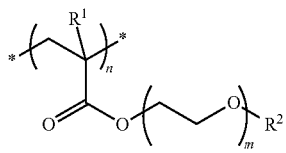

wherein $R^1$ represents a hydrogen atom or a methyl group, $R^2$ represents an alkyl group, m represents 1 to 5, and n represents the number of repetitions.

Preferably, the hydrophilic polymer layer has a thickness of 10 to 1000 nm.

Advantageous Effects of Invention

The present invention provides a hydrophilic substrate that includes on its surface a hydrophilic polymer layer formed of a hydrophilic polymer having a number average molecular weight of 40,000 or more. Such a hydrophilic substrate has a smooth hydrophilic polymer surface, and thus can be expected to have an improved ability to capture specific cells such as cancer cells.

BRIEF DESCRIPTION OF DRAWINGS

FIG. 1 shows exemplary photographs of hydrophilic substrates prepared by coating with the polymers of Example 2 and Comparative Example 1.

DESCRIPTION OF EMBODIMENTS

The present invention provides a hydrophilic substrate that includes on its surface a hydrophilic polymer layer formed of a hydrophilic polymer having a number average molecular weight of 40,000 or more. Such a substrate is coated with a hydrophilic polymer layer having a smooth surface.

Since the number of tumor cells (e.g. cancer cells) appearing in biological fluid, such as circulating tumor cells (several to hundreds of cells/1 mL of blood), is very small, it is considered important to capture as many tumor cells present in the sampled biological fluid as possible to analyze them. The present invention uses a hydrophilic polymer having a predetermined molecular weight to form a hydrophilic polymer layer having a smooth surface. As the smoothness of the hydrophilic polymer layer affects the ability to capture specific cells such as cancer cells, the formed very smooth surface can be expected to have a higher ability to capture specific cells. Thus, it can be expected that by counting the number of tumor cells captured onto the hydrophilic polymer layer, one can determine the number of tumor cells in biological fluid, e.g. in order to evaluate the cancer-treating effect. Moreover, the captured tumor cells may be cultured and then used to determine the effect of drugs such as anticancer drugs. This allows us to determine the effect of drugs such as anticancer drugs ex vivo before administration, and also helps to screen drugs such as anticancer drugs.

The hydrophilic polymer has a number average molecular weight (Mn) of 40,000 or more. The hydrophilic polymer having a Mn of 40,000 or more can be used to form a polymer layer having a smoother surface which can be expected to have an improved ability to capture specific cells such as cancer cells. The Mn of the hydrophilic polymer is preferably 60,000 or more, more preferably 70,000 or more. The upper limit of the Mn is not particularly critical, but in view of solubility in solvents (e.g. methanol) and coating properties of the hydrophilic polymer solution, the Mn is preferably 300,000 or less, more preferably 200,000 or less.

In view of smoothness of the polymer layer surface, the hydrophilic polymer preferably has a weight average molecular weight (Mw) of 150,000 or more, more preferably 200,000 or more, still more preferably 250,000 or more. The upper limit of the Mw is not particularly critical, but in view of solubility in solvents (e.g. methanol) and coating properties of the hydrophilic polymer solution, the Mw is preferably 800,000 or less, more preferably 600,000 or less.

Herein, Mn and Mw may be determined by gel permeation chromatography (GPC) (GPC-8000 series available from TOSOH Corporation, detector: differential refractometer, column: TSKGEL SUPERMULTIPORE HZ-M available from TOSOH Corporation) calibrated with polystyrene standards.

The hydrophilic polymer may be appropriately selected from polymers having hydrophilicity. For example, it may be a homopolymer or copolymer of one or two or more hydrophilic monomers, or a copolymer of one or two or more hydrophilic monomers with an additional monomer. Examples of such homopolymers and copolymers include polyacrylic acid, polyacrylic acid esters, polymethacrylic acid, polymethacrylic acid esters, polyacryloylmorpholine, polymethacryloylmorpholine, polyacrylamide, and polymethacrylamide.

The hydrophilic monomers may be any monomer containing a hydrophilic group. Examples of the hydrophilic group include known hydrophilic groups such as an amide group, a sulfuric acid group, a sulfonic acid group, a carboxylic acid group, a hydroxyl group, an amino group, and an oxyethylene group.

Specific examples of the hydrophilic monomers include (meth)acrylic acid, (meth)acrylic acid esters (e.g. alkoxyalkyl(meth)acrylates such as methoxyethyl (meth)acrylate, and hydroxyalkyl (meth)acrylates such as hydroxyethyl (meth)acrylate), (meth)acrylamide, and (meth)acrylamide derivatives containing cyclic groups (e.g., (meth)acryloylmorpholine). Preferred among these are (meth)acrylic acid, (meth)acrylic acid esters, alkoxyalkyl (meth)acrylates, and (meth)acryloylmorpholine, with alkoxyalkyl (meth)acrylates being more preferred, with 2-methoxyethyl acrylate being particularly preferred.

The additional monomer may be appropriately selected as long as it does not inhibit the effects of the hydrophilic polymer. Examples include aromatic monomers such as styrene, vinyl acetate, and N-isopropylacrylamide which can impart temperature responsiveness.

In particular, the hydrophilic polymer is preferably at least one selected from the group consisting of poly(meth)acryloylmorpholine and polymers represented by the following formula (I):

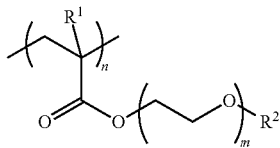

(I)

wherein $R^1$ represents a hydrogen atom or a methyl group, $R^2$ represents an alkyl group, m represents 1 to 5, and n represents the number of repetitions.

The alkyl group represented by $R^2$ preferably has 1 to 10 carbon atoms, more preferably 1 to 5 carbon atoms. In particular, $R^2$ is particularly preferably a methyl group or an ethyl group. The symbol m is preferably 1 to 3. The symbol n (number of repeating units) is preferably 300 to 2500, more preferably 450 to 2000.

Alternatively, the hydrophilic polymer may also suitably be a copolymer of at least one hydrophilic monomer selected from the group consisting of (meth)acryloylmorpholine and compounds represented by the formula (I-1) below with an additional monomer.

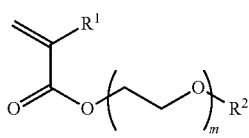

(I-1)

In formula (I-1), $R^1$, $R^2$, and m are as defined above.

The hydrophilic substrate includes a substrate on whose surface a hydrophilic polymer layer formed of the hydrophilic polymer is formed. Examples of the substrate include acrylic resins (polyacrylic resins) such as polymethyl acrylate, polymethyl methacrylate, polyacrylic acid, and polymethacrylic acid; cycloolefin resins (polycycloolefins); carbonate resins (polycarbonates); styrene resins (polystyrenes); polyester resins such as polyethylene terephthalate (PET); polydimethylsiloxanes; and glass such as soda-lime glass and borosilicate glass.

The hydrophilic polymer layer (the layer formed of the hydrophilic polymer) preferably has a thickness of 10 to 1000 nm, more preferably 30 to 500 nm, still more preferably 50 to 350 nm. When the thickness is adjusted within the range indicated above, selective capture of cancer cells and low adsorption of other proteins and cells can be well achieved.

The surface of the hydrophilic polymer layer preferably at least partially (partially or entirely) has a contact angle with water of 25° to 85°, more preferably 35° to 75°.

The surface of the hydrophilic polymer layer preferably has a surface roughness Ra of 1.0 or less, more preferably 0.8 or less, still more preferably 0.6 or less. The lower limit of the Ra is not particularly critical, and lower Ra is better.

Herein, the surface roughness Ra refers to the center-line surface roughness Ra defined in JIS B0601-2001.

The hydrophilic polymer layer may be formed by dissolving or dispersing a hydrophilic polymer in any solvent to prepare a hydrophilic polymer solution or dispersion, and entirely or partially coating the surface of a substrate with the hydrophilic polymer solution or dispersion by a known method, such as (1) by injecting the hydrophilic polymer solution or dispersion into the substrate surface (the recess of the substrate) and retaining and drying it for a predetermined time, or (2) by applying (spraying) the hydrophilic polymer solution or dispersion to the substrate surface and retaining and drying it for a predetermined time. Thus, a hydrophilic substrate including a polymer layer formed of a hydrophilic polymer (hydrophilic substrate including on its surface a hydrophilic polymer layer formed of a hydrophilic polymer) can be prepared. Then, the hydrophilic substrate including a hydrophilic polymer layer may be combined with other components as needed, to prepare an apparatus capable of analyzing specific cells.

The solvent, injection method, application (spraying) method, and other conditions may be conventionally known materials or methods.

The retention/drying time in the method (1) or (2) may be selected appropriately according to the size of the substrate, the type of liquid introduced, and other factors. The retention time is preferably five minutes to ten hours, more preferably ten minutes to five hours, still more preferably 15 minutes to two hours. The drying is preferably performed at room temperature (about 23° C.) to 80° C., more preferably at room temperature to 50° C. Moreover, the drying may be carried out under reduced pressure. Furthermore, the hydrophilic polymer solution or dispersion may be retained for a certain period of time, optionally followed by discharging the excess solution or dispersion before drying.

The solvent may be any solvent that can dissolve the hydrophilic polymer and may be selected appropriately according to the hydrophilic polymer used. Examples include water, organic solvents, and solvent mixtures thereof. Examples of the organic solvents include alcohols such as methanol, ethanol, n-propanol, i-propanol, and methoxypropanol, ketones such as acetone and methyl ethyl ketone, tetrahydrofuran, acetonitrile, ethyl acetate, and toluene.

It can be expected that specific cells can be captured, for example, by contacting a sample (blood or biological fluid) with the hydrophilic substrate including a hydrophilic polymer layer. Then, it can be expected that by counting the number of captured specific cells, one can determine the number of specific cells in the sampled blood or biological fluid, e.g. in order to evaluate the cancer-treating effect.

EXAMPLES

The present invention is specifically described with reference to, but not limited to, examples below.

Example 1

Using a solution of azobisisobutyronitrile (AIBN) in methanol (12.5 mg/mL), 2-methoxyethyl acrylate (a 45 wt % methanol solution) was thermally polymerized at 60° C. for seven hours to produce poly(2-methoxyethyl acrylate).

Example 2

Using azobisisobutyronitrile (AIBN), 2-methoxyethyl acrylate (a 68 wt % methanol solution) was thermally polymerized at 60° C. for seven hours to produce poly(2-methoxyethyl acrylate).

Comparative Example 1

Using azobisisobutyronitrile (AIBN), 2-methoxyethyl acrylate (a 23 wt % methanol solution) was thermally polymerized at 60° C. for seven hours to produce poly(2-methoxyethyl acrylate).

[Mn and Mw of Hydrophilic Polymer]

The Mw and Mn of the poly(2-methoxyethyl acrylate) polymers were measured as described earlier.

[Thickness of Hydrophilic Polymer Layer (Coating Layer)]

The thickness of the hydrophilic polymer layer of each hydrophilic substrate was determined by measuring (photographing) a cross section of the hydrophilic polymer layer using a TEM at an accelerating voltage of 15 kV and a magnification of 1000 times.

[Contact Angle with Water]

A volume of 2 μL of distilled water was dropped onto the surface of the hydrophilic polymer layer of each hydrophilic substrate. Thirty seconds later, the contact angle was measured by the 0/2 method at room temperature.

[Surface Roughness Ra]

The surface roughness of each hydrophilic substrate (hydrophilic polymer layer) was measured contactless at four points using a laser microscope. The average of the four Ra values was taken as the surface roughness Ra (the average of the center-line surface roughnesses Ra defined in JIS B0601-2001).

TABLE 1

| | Example 1 | Example 2 | Comparative Example 1 |
|---|---|---|---|
| Number average molecular weight (Mn) | 79195 | 120720 | 34697 |
| Weight average molecular weight (Mw) | 308132 | 453957 | 119227 |

TABLE 1-continued

| | Example 1 | Example 2 | Comparative Example 1 |
|---|---|---|---|
| Thickness of hydrophilic polymer layer (coating layer) (nm) | 280 | 290 | 265 |
| Contact angle with water (°) | 57.2 | 68.7 | 41.9 |
| Surface roughness (Ra) | 0.24 | 0.18 | 1.82 |

Next, the poly(2-methoxyethyl acrylate) polymers were each used to prepare a 0.2 wt % methanol solution. A glass (borosilicate glass) slide was coated with each solution and dried at 40° C. under reduced pressure to form a poly(2-methoxyethyl acrylate) coating on the glass substrate, whereby a hydrophilic substrate was prepared.

FIG. 1 shows photographs of the hydrophilic substrates prepared by coating with the polymers of Example 2 and Comparative Example 1, among the hydrophilic substrates of Examples 1 and 2 and Comparative Example 1.

In the substrate of Comparative Example 1, a ring-shaped white cloudiness was observed in the periphery. Such a ring-shaped white cloudiness was observed in all substrates prepared using poly(2-methoxyethyl acrylate) polymers produced in the same manner as in Comparative Example 1 though some of the substrates showed slightly different ring shapes.

In contrast, smooth coatings with no cloudiness were formed in the substrates of Examples 1 and 2 using polymers having a Mn of 40,000 or more. Since the cloudy parts reflected aggregation of the poly(2-methoxyethyl acrylate) polymers and surface irregularities, it was easily conceivable that such parts would have a different ability to capture specific cells than the other smooth parts, resulting in variations inability to capture. It was thus expected that the substrates with a smooth and unclouded coating surface would have less variation in ability to capture.

The invention claimed is:

1. A hydrophilic substrate, comprising on its surface a hydrophilic polymer layer formed of a hydrophilic polymer having a number average molecular weight of 40,000 or more, wherein
   the hydrophilic polymer layer has a thickness of 10 to 350 nm,
   the hydrophilic polymer layer is formed of at least one hydrophilic polymer selected from the group consisting of polymers represented by the following formula (I):

$$\left(\begin{array}{c}R^1\\|\\-CH_2-C-\\|\end{array}\right)_n \quad O=C \quad O \quad \left(\begin{array}{c}O\\\end{array}\right)_m R^2 \tag{I}$$

wherein $R^1$ represents a hydrogen atom or a methyl group, $R^2$ represents an alkyl group, m represents 1 to 5, and n represents the number of repetitions, and
   the surface of the hydrophilic polymer layer at least partially has a contact angle with water of 35° to 75°.

2. The hydrophilic substrate according to claim 1, wherein the hydrophilic substrate is obtained by surface coating with a solution of the hydrophilic polymer.

* * * * *